United States Patent
Bisson et al.

(10) Patent No.: US 6,891,607 B2
(45) Date of Patent: May 10, 2005

(54) DEVICE FOR MEASURING AND DYNAMICALLY COMPENSATING VARIATIONS IN POWER LOSS IN AN OPTICAL TRANSMISSION LINE WITH A SUPERVISORY CHANNEL, AND AN ASSOCIATED METHOD

(75) Inventors: Arnaud Bisson, Orsay (FR); Alice Michaud, Paris (FR); Emmanuel Rossi, Paris (FR); Guy Balland, Ste Genevieve des Bois (FR)

(73) Assignee: Alcatel, Paris (FR)

( * ) Notice: Subject to any disclaimer, the term of this patent is extended or adjusted under 35 U.S.C. 154(b) by 22 days.

(21) Appl. No.: 10/407,245

(22) Filed: Apr. 7, 2003

(65) Prior Publication Data

US 2003/0189700 A1 Oct. 9, 2003

(30) Foreign Application Priority Data

Apr. 8, 2002 (FR) .......................................... 02 04343

(51) Int. Cl.[7] .............................................. G01N 21/00
(52) U.S. Cl. .................................................... 356/73.1
(58) Field of Search ........................ 356/73.1; 398/136, 398/158, 168, 192, 79; 357/110, 124, 161, 179, 181, 174, 134, 135; 385/24

(56) References Cited

U.S. PATENT DOCUMENTS

| | | | |
|---|---|---|---|
| 4,726,676 A | * | 2/1988 | Maslaney et al. .......... 356/73.1 |
| 6,057,959 A | | 5/2000 | Taylor et al. |
| 6,335,823 B2 | | 1/2002 | Ohshima et al. |
| 6,359,727 B1 | | 3/2002 | Nakazato |
| 6,798,992 B1 | * | 9/2004 | Bishop et al. ................ 398/45 |
| 2001/0050807 A1 | | 12/2001 | Deguchi et al. |

FOREIGN PATENT DOCUMENTS

| | | |
|---|---|---|
| EP | 0 902 565 A2 | 3/1999 |
| EP | 0 917 313 A2 | 5/1999 |
| EP | 1 033 834 A2 | 9/2000 |
| JP | 10-48094 A | 2/1998 |

OTHER PUBLICATIONS

Patent Abstracts of Japan, vol. 1997, No. 02, Feb. 28, 1997 & JP 08271380 A (Sony Tektronix Corp), Oct. 18, 1996.

* cited by examiner

Primary Examiner—Tu T. Nguyen
(74) Attorney, Agent, or Firm—Sughrue Mion, PLLC

(57) ABSTRACT

An optical device that measures and dynamically compensates power loss variations in an optical fiber based on supervisory signals. An injector injects supervisory signals having a predefined optical power downstream of the fiber entry end and a detector extracts the supervisory signals at the exit end of the fiber to detect their optical power. Based on the detected optical power and the predefined optical power, the optical power loss of the supervisory signals in the fiber is determined. The optical power loss and the nominal power loss in the fiber are compared to determine a variation in the power loss in the optical fiber. A controller coupled to the detector and to the exit end of the fiber modifies the power of primary signals delivered by the exit end of the fiber as a function of the detected variation in power loss.

21 Claims, 1 Drawing Sheet

DEVICE FOR MEASURING AND DYNAMICALLY COMPENSATING VARIATIONS IN POWER LOSS IN AN OPTICAL TRANSMISSION LINE WITH A SUPERVISORY CHANNEL, AND AN ASSOCIATED METHOD

The field of the invention is that of optical devices, more particularly that of measuring and compensating power loss in optical signal transmission lines provided with a supervisory channel dedicated to transporting network management data.

BACKGROUND OF THE INVENTION

Because of their components (optical fibers, amplifiers, etc.), optical transmission lines suffer power losses that degrade transmission performance and can in some circumstances lead to processing errors and even to loss of data. While the line is being installed, the nominal power losses in the fiber can be measured and devices for statically compensating them can be adjusted accordingly. However, optical power losses vary with time. The variations in the losses are usually related to aging of components and/or to maintenance or repair work.

To track changing power losses, it has been proposed to measure the optical output power of the primary optical signals at the exit end of the optical fibers periodically. This type of measurement cannot distinguish a loss induced by an optical fiber from a loss induced by an optical amplifier feeding the fiber with primary signals. US patent application 2001/0050807 describes a method of determining the losses in an optical transmission line including a fiber used both for transmission of an optical signal and for amplification of the signal by the Raman effect. This kind of amplification uses an optical pump source. The above prior art document proposes switching the pump source to compare the power of the signal received with and without pumping to deduce the losses in the fiber.

In lines provided with a supervisory channel, it is possible in theory to measure the input optical power of the primary signals to be transmitted and to transmit information representative of the measured power on the supervisory channel, using supervisory signals, so that the optical input power can be compared to the output power. However, this type of detection is complicated to implement, and most importantly requires processing time unsuited to a procedure for dynamically adjusting optical power.

The document JP 0827 1380 discloses a method which transmits a supervisory signal with information describing the supervisory signal in the form in which it exists prior to transmission. That method therefore has the drawback of necessitating transmission of information describing the supervisory signal.

It is desirable not only to measure dynamically the variations in the losses caused by a transmission fiber, but also to compensate dynamically the effect on the primary signals of those variations. Thus an object of the invention is to propose a method of dynamically measuring the variations in the losses and dynamically compensating their effect.

SUMMARY OF THE INVENTION

The invention comprises an optical device for measuring and dynamically compensating power loss variations in an optical transmission line including injector means adapted to inject supervisory signals and an optical fiber having an entry end adapted to receive primary optical signals and the supervisory optical signals and an exit end adapted to deliver the primary signals and the supervisory signals. The injector means are adapted to inject supervisory signals that have a chosen (and preferably constant) optical power. The measuring device includes detector means adapted to extract the supervisory signals at the exit end of the fiber to determine their optical power and to deduce therefrom, and from the chosen optical power, primary information representative of the optical power loss of the supervisory signals in the fiber, and to compare the primary information and a value representative of a nominal power loss (of the supervisory signals) in the fiber, to deliver secondary information representative of a variation in power loss in the optical fiber.

The expressions "input power" and "output power" respectively mean the optical power of the input signals that enter the fiber at its entry end and the optical power of the output signals that leave the fiber at its exit end.

According to the invention, the measuring and compensation device comprises control means coupled to said detector means and to the exit end of the fiber and adapted, if a variation in the power loss of the supervisory signals in the fiber is detected, to modify the power of the signals delivered by the exit end of the fiber as a function of the detected variation.

Accordingly, in the event of a variation (increase) in the power loss of the supervisory signals in the fiber, the device can dynamically adjust the output power of the signals to maintain a substantially constant nominal power loss.

The control means can advantageously include a variable optical attenuator (VOA) coupled to the exit end of the fiber, upstream of the detector means. Because the VOA attenuates the power of the primary signals at the exit end of the fiber, the comparator means can request the control means to reduce said attenuation in the event of detecting a variation (increase) in the power loss in the fiber.

The detector means preferably include an optical filter for extracting the supervisory signals, an electronic circuit coupled to the filter and adapted to deliver the primary information, and comparator means adapted to compare the primary information and the nominal power loss in order to deliver the secondary information.

The device can equally include auxiliary detector means adapted to:

i) extract the supervisory signals upstream of an auxiliary optical device (such as an add and drop wavelength division multiplexer) installed on the optical fiber between its entry end and its exit end to determine their optical power and to deduce, from that power, the chosen (nominal) optical power, and the nominal losses in the portion of the fiber upstream of the auxiliary device, information representative of the optical power loss of the supervisory signals in said upstream portion of the fiber, and ii) to inject downstream of the auxiliary device new supervisory signals slaved to the detected power of the extracted supervisory signals, possibly after subtracting from their optical power a value substantially equal to the nominal power loss induced by the auxiliary device.

Thus it is advantageously possible to determine whether the variation in the power loss has occurred upstream or downstream of the auxiliary device.

The invention also comprises an installation for transmitting optical signals carrying data, the installation comprising an optical transmission line consisting of a plurality of optical fibers connected by optical amplifiers, each fiber delivering primary signals and being coupled to a measuring and compensation device of the type defined above.

The invention further proposes a method of measuring and dynamically compensating variations in the power loss in an optical transmission line comprising an optical fiber having an input end adapted to receive primary optical signals and supervisory optical signals and an exit end adapted to deliver said primary signals and said supervisory signals, which method consists in injecting the supervisory signals into the fiber at a chosen (and preferably constant) optical power and extracting said supervisory signals at the exit end of the fiber in order to:

determine their power and deduce from said power and the chosen optical power primary information representative of the optical power loss of the supervisory signals in the fiber, and compare the primary information and a value representative of a nominal power loss in the fiber in order to deliver secondary information representative of a variation in the power loss in the said optical fiber, which method is characterized in that, if a variation in the power loss of the supervisory signals in the fiber is detected, it further modifies the power of the primary signals delivered by the exit end of the fiber as a function of said detected variation.

The secondary information delivered is preferably representative of the difference between the primary information and the chosen (nominal) value. For example, the secondary information is either information that is representative of the magnitude of the difference or information that has two states, of which a first state is associated with a positive difference between the primary information and the chosen value and a second state is associated with a negative or zero difference between the primary information and the chosen value.

Moreover, if an auxiliary optical device is installed on the fiber between its entry and exit ends:

the supervisory signals are preferably extracted upstream of said auxiliary device, their optical power is determined and information representative of the optical power loss of the supervisory signals in the upstream portion of the fiber is deduced from that power, the chosen (nominal) optical power, and the nominal losses in the fiber portion upstream of the auxiliary device, and new supervisory signals slaved to the detected power of the extracted supervisory signals are injected downstream of the auxiliary device, possibly after subtracting from their optical power a value substantially equal to the nominal power loss induced by the auxiliary device.

The device, the installation and the method of the invention are all particularly, although not exclusively, suitable for measuring and/or dynamically controlling power losses in optical transmission lines used in the field of telecommunications, in particular when said lines carry wavelength division multiplexed (WDM) data channels.

BRIEF DESCRIPTION OF THE DRAWINGS

Other features and advantages of the invention become apparent on reading the following detailed description and examining the appended drawings, in which.

DETAILED DESCRIPTION OF THE INVENTION

Figure 1:
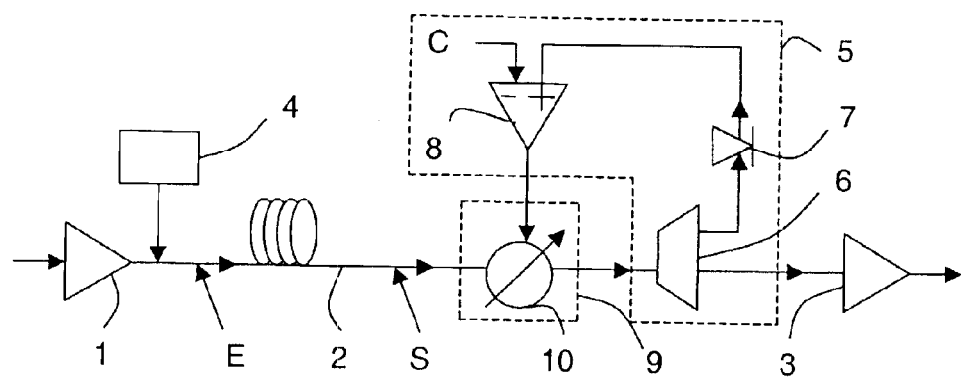
FIG. 1 is a diagram showing a first embodiment of an optical device of the invention.

A first embodiment of a device of the invention installed on a portion of an optical transmission line is described first with reference to FIG. 1. This portion comprises a first optical amplifier 1 (input amplifier) connected to the entry end E of an optical fiber 2, to deliver thereto primary optical signals carrying data to be transmitted, for example in the form of wavelength division multiplexes. In the embodiment shown, the exit end S of the fiber 2 is coupled to a second optical amplifier 3 (output amplifier) connected to another portion of the transmission line. The nominal power loss of the optical fiber 2 is known.

The device of the invention firstly comprises a supervisory module 4 connected to the output of the input amplifier 1, for example by means of an optical coupler, and delivering supervisory signals having a chosen and preferably constant (nominal) optical power. The supervisory signals are sent at a specific frequency reserved for them and therefore occupy a dedicated supervisory channel.

The primary signals and the supervisory signals travel in the fiber 2 as far as its exit end 6, which they reach with an "output" optical power.

The device also comprises a detector module 5 downstream of the exit end S of the fiber 2 and upstream of the output amplifier 3. This module is adapted to extract the supervisory signals leaving the fiber 2 to deduce therefrom primary information representative of their optical output power. To be more precise, the detector module 5 includes a demultiplexer 6 adapted to extract only the supervisory signals (on the dedicated channel) from the signals in transit between the exit end S of the fiber 2 and the output amplifier 3. The supervisory signals are fed to a photodiode electronic circuit 7 adapted to measure their average output power. Knowing the nominal power of the supervisory signals, the electronic circuit 7 can therefore deduce therefrom the power loss induced by the fiber 2. It therefore delivers primary information that is representative not only of the average power of the supervisory signals but also of the power loss induced by the fiber 2.

The detector module 5 also includes a comparator 8 fed with primary information by the electronic circuit 7. The comparator 8 is adapted to compare the primary information to a set point C representative of the nominal optical power loss of the supervisory signals.

The primary information and the set point C are preferably fed to a non-inverting input (+) and an inverting input (−), respectively, of the comparator 8. The set point C enables the comparator 8 to estimate the difference between the nominal loss and the real loss induced by the fiber 2.

Thus the comparator 8 receives the primary information, compares it to the set point C, and delivers secondary information representative of the difference between the primary information and the set point C, in other words representative of a variation in the power loss in the fiber 2 relative to a nominal value. The secondary information can either be information that is directly representative of the measured difference or information that take two states, of which a first state, for example a "high" state, is associated with a positive difference and a second state, for example a "low" state, is associated with a negative or zero difference.

The device of the invention can also be used to adjust the power at the exit end S of the fiber 2. In this case, as shown in FIG. 1, it further comprises a control module 9 including a device 10 for modifying the power of the primary signals and the supervisory signals before they reach the demultiplexer 6 and therefore the output amplifier 3. The device 10 is a variable optical attenuator (VOA), for example, at the exit end of the fiber 2 and upstream of the detector circuit 5. Consequently, the supervisory signals that are sampled by the demultiplexer 6 of the detector circuit 5 are attenuated beforehand by the VOA 10 so that if a variation (increase) in the power loss in the fiber 2 is detected, the control module 9 can order said VOA 10 to reduce the attenuation (i.e. to compensate the increase in the loss in the fiber), which is equivalent to amplifying the modulated signals to return them to their nominal output power.

Accordingly, if the comparator 8 supplies the control module 9 with secondary information in the "high" state, for example, the control module orders the VOA 10 to reduce the attenuation by a chosen amount, for example an amount substantially equal to 3 dB. Alternatively, if the secondary information represents the magnitude of the difference between the nominal loss (C) of the fiber and the real loss, the control module 9 orders the VOA 10 to reduce the attenuation by an amount substantially equal to the difference.

Accordingly, only a variation in the power loss induced by the fiber 2 leads to automatic adjustment of the attenuation.

Figure 2:
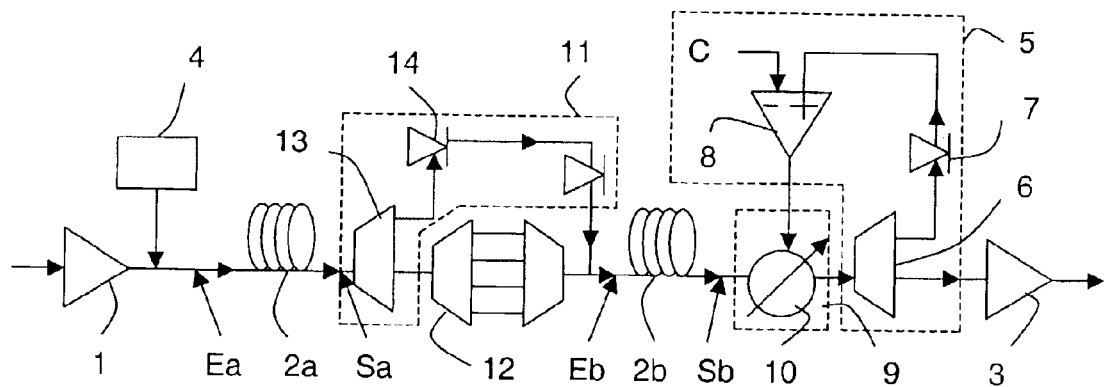
FIG. 2 is a diagram showing a second embodiment of an optical device of the invention.

A second embodiment of a device of the invention is described next with reference to FIG. 2. This second embodiment is used on a transmission line in which the fiber is divided into two portions 2a and 2b "connected" by an auxiliary optical device 12. This embodiment uses all of the components of the first embodiment plus an auxiliary extractor module 11 for determining if an additional power loss has been induced in the first or second fiber portion 2a or 2b.

In the example shown, the auxiliary device 12 is an optical add and drop multiplexer (OADM).

In this example, the extractor module 11 includes a filter (or coupler) 13 which is downstream of the exit end Sa of the first fiber portion 2a and upstream of the OADM 12 and is adapted to extract only the supervisory signals in the dedicated channel.

The filter 11 delivers the extracted supervisory signals to a photodiode electronic circuit 14 which measures their power. The circuit 14 advantageously also analyses the network management information contained in the supervisory signals. Once the power has been measured, it is compared to the value that it should normally have, given the nominal power of the supervisory signals delivered by the supervisory module 4 and the nominal losses induced by the first part 2a of the fiber, in order to determine any variation in the power loss in the first fiber portion 2a.

The supervisory signals are then regenerated, and thus new supervisory signals are injected by the circuit 14 downstream of the auxiliary device, with a power substantially equal to the detected power of the supervisory signals extracted from the first portion 2a of the fiber. A value substantially equal to the nominal power loss induced by the OADM 12 can be subtracted from the optical power of the new supervisory signals before injecting them into the entry end Eb of the second portion 2b of the fiber using a coupler or an optical filter.

Of course, the modulation, detection, extraction, and control circuits described hereinabove are described by way of illustrative example and lend themselves to many variants and adaptations.

The invention also provides a method of dynamically measuring power loss in an optical transmission line including an optical fiber whose entry end E is adapted to receive primary optical signals and supervisory optical signals and whose exit end S is adapted to deliver said primary signals and said supervisory signals.

This can be achieved using the device and the installation described above. Because the main and optional functions and sub-functions of the steps of the method are substantially identical to those of the various means constituting the device, only the steps implementing the main functions of the method of the invention are summarized hereinafter.

The method comprises a first step in which the supervisory signals are injected into the fiber 2 at a chosen (nominal) optical power, which is preferably constant, and a second step in which the supervisory signals are extracted at the exit end of the fiber, firstly to determine their optical power and to deduce from that power and the chosen optical power primary information representative of the optical power loss of the supervisory signals in the fiber, and secondly to compare the primary information to a value representative of a nominal power loss in the fiber, in order to deliver secondary information representative of a variation in the power loss in said optical fiber.

The method further comprises a complementary adjustment step in which, if an (unauthorized) variation in the power loss induced by the fiber 2 is detected, the power of the signals delivered by the exit end S of the fiber 2 is modified as a function of the detected variation.

The invention is not limited to the embodiments of the device, installation, and method described above by way of example only, and encompasses any variants that the person skilled in the art might envisage that fall within the scope of the following claims.

What is claimed is:

1. An optical device for measuring and dynamically compensating power loss variations in an optical transmission line comprising an optical fiber having an entry end to receive primary optical signals and an exit end to deliver said primary signals, the device comprising:

injector means to inject supervisory signals having a predefined optical power into said line;

detector means that
extract said supervisory signals at the exit end of said fiber to determine the optical power of said supervisory signals and determine primary information representative of the optical power loss of the supervisory signals in said fiber based on said determined optical power of said supervisory signals and said predefined optical power, and
compare said primary information and a value representative of a nominal power loss in said fiber to deliver secondary information representative of a variation in the power loss in said fiber; and control means coupled to said detector means and to the exit end of said fiber and, if a variation in the power loss of the supervisory signals in said fiber is detected, for modifying the power of the primary signals delivered by the exit end of said fiber as a function of said detected power loss variation.

2. A device according to claim 1, wherein said detector means delivers secondary information representative of the magnitude of the difference between said primary information and said nominal loss value.

3. A device according to claim 1, wherein said detector means delivers secondary information with two states, of which a first state is associated with a positive difference between said primary information and said nominal loss value and a second state is associated with a negative or zero difference between said primary information and said nominal loss value.

4. A device according to claim 1, wherein said control means comprise a variable optical attenuator coupled to the exit end of said fiber.

5. A device according to claim 1, wherein said detector means comprise an optical device to extract said supervisory signals, an electronic circuit coupled to said optical device to deliver said primary information, and comparator means to compare said primary information and the value representative of the nominal power loss to deliver said secondary information.

6. A device according to claim 1, further comprising auxiliary detector means to extract said supervisory signals upstream of an auxiliary optical device installed on said fiber between its entry end and its exit end to detect the optical power of said extracted signals, and to determine from said detected optical power, said predefined optical power and the nominal losses in the portion of said fiber upstream of the auxiliary device information representative of the optical power loss of the supervisory signals in said upstream portion of said fiber, and to inject downstream of the auxiliary device new supervisory signals slaved to the detected power of the extracted supervisory signals.

7. A device according to claim 6, wherein said auxiliary device is an optical add and drop multiplexer.

8. An installation for transmitting optical signals carrying data, the installation comprising an optical transmission line comprising of a plurality of optical fibers connected by optical amplifiers each delivering primary signals, wherein each optical fiber is coupled to a device according to claim 1 for measuring and dynamically compensating power loss variations.

9. A method of measuring and dynamically compensating variations in the power loss in an optical transmission line comprising an optical fiber having an input end adapted to receive primary optical signals and supervisory optical signals and an exit end adapted to deliver said primary signals and said supervisory signals, wherein said method comprises:

injecting said supervisory signals into said fiber at a predetermined optical power and extracting said supervisory signals at the exit end of said fiber, detecting the optical power of said extracted signals, determining from said detected power and said predefined optical power primary information representative of the optical power loss of the supervisory signals in said fiber, and comparing said primary information and a value representative of a nominal power loss in said fiber to deliver secondary information representative of a variation in the power loss in the said fiber, and if a variation in the power loss of the supervisory signals in said fiber is detected, modifying the power of the primary signals delivered by the exit end of said fiber as a function of said detected variation.

10. A method according to claim 9, wherein said secondary information is representative of the difference between said primary information and said nominal loss value.

11. A method according to claim 10, wherein said secondary information is representative of the magnitude of said difference.

12. A method according to claim 10, wherein said secondary information is information with two states, of which a first state is associated with a positive difference between said primary information and said nominal loss value and a second state is associated with a negative or zero difference between said primary information and said nominal loss value.

13. A method according to claim 9, wherein, when an auxiliary optical device is installed on said fiber between its entry end and its exit end, the method further comprises:

extracting said supervisory signals upstream of said auxiliary device, detecting the optical power and determining from said detected optical power, said predefined optical power, and the nominal losses in said fiber portion upstream of the auxiliary device information representative of the optical power loss of the supervisory signals in said upstream portion of said fiber, and injecting downstream of the auxiliary device new supervisory signals slaved to the detected power of the extracted supervisory signals.

14. An optical device for measuring and dynamically compensating power loss variations in an optical transmission line comprising an optical fiber having an entry end to receive primary optical signals and an exit end to deliver said primary signals, the device comprising:

a signal injector to inject supervisory signals having a predefined optical power into said line;

a signal detector that extracts said supervisory signals at the exit end of said fiber to detect the optical power of said extracted signals, determines an optical power loss of the supervisory signals in said fiber based on said detected optical power of said extracted signals and said predefined optical power, and compares said optical power loss and a nominal loss value of said fiber to determine a power loss variation; and a controller that is coupled to said signal detector and to the exit end of said fiber and, if a power loss variation is detected, modifies the power of the primary signals delivered by the exit end of said fiber as a function of said power loss variation.

15. A device according to claim 14, wherein said signal detector outputs information representative of the magnitude of the difference between said primary information and said nominal loss value.

16. A device according to claim 14, wherein said signal detector outputs information with two states, wherein a first state is associated with a positive difference between said optical power loss and said nominal loss value and a second state is associated with a negative or zero difference between said optical power loss and said nominal loss value.

17. A device according to claim 14, wherein said controller comprises a variable optical attenuator coupled to the exit end of said fiber.

18. A device according to claim 14, wherein said signal detector comprises an optical demultiplexer to extract said supervisory signals, an electronic circuit coupled to said optical demultiplexer to deliver said primary information, and a comparator that compares said optical power loss and said nominal loss value to output said power loss variation.

19. A device according to claim 14, further comprising an auxiliary signal detector that extracts said supervisory signals upstream of an auxiliary optical device installed on said fiber between its entry end and its exit end to detect the optical power of said extracted signals, determines from said detected optical power, said predefined optical power and the nominal losses in the portion of said fiber upstream of the auxiliary device an optical power loss of the supervisory signals in said upstream portion of said fiber, and injects downstream of the auxiliary device new supervisory signals slaved to the detected power of the extracted supervisory signals.

20. A device according to claim 19, wherein said auxiliary device is an optical add and drop multiplexer.

21. An installation for transmitting optical signals carrying data, the installation comprising an optical transmission line comprising of a plurality of optical fibers connected by optical amplifiers each delivering primary signals, wherein each optical fiber is coupled to a device according to claim 14 for measuring and dynamically compensating power loss variations.

* * * * *